3,240,618
CONCRETE FORM PANELS
Charles B. Hemming, Drewville Heights, Brewster, N.Y., assignor to United States Plywood Corporation, New York, N.Y., a corporation of New York
No Drawing. Filed Aug. 22, 1961, Ser. No. 133,052
15 Claims. (Cl. 117—5.1)

The present invention is broadly concerned with an improved board for utilization as a concrete and cement forming board and with its method of manufacture. The invention is more particularly concerned with an improved plywood concrete form board which has increased mechanical strength and life, and which will impart to the formed concrete a very desirable uniform glass smooth surface. The plywood form board of the present invention has greatly improved parting or separation characteristics and, thus, may be readily and easily removed and separated from the hardened cement or concrete with no deleterious effects either on the cement or on the board. The present concrete form board is further characterized by having a factory applied unique plastic coating, which coating is hard and yet flexible. The factory applied unique coating has a high resistance to damage by impact as well as abrasion resistance, and will very effectively resist the effects of water and chemicals, such as the various alkalies and the like which are encountered in concrete and cement work. In essence, the improved panels of the present invention comprise a plywood board coated or impregnated with an oil, preferably a hydrocarbon oil, and then surfaced with a polymer coating, preferably a urethane type coating.

It is well known in the art that in concrete and cement work, it is essential that the forming bodies which mold the concrete until it has set be of certain characteristics. It is desirable that these forming materials have the required strength in order to avoid distortion of the heavy concrete and that, after the concrete has set, these forming materials or forming members be readily removable from the concrete without surface damage to either the cement or to the forming board. If damage results to the surface of the concrete, it is necessary to refinish the cement surface which requires additional materials and time-consuming labor. On the other hand, if the board is damaged, it cannot be re-used since the surface of the subsequent set concrete will be rough at the damaged areas and would have to be refinished. Thus, many various proposals have been made as to what types of material are satisfactory and desirable so as not to cause damage either to the cement surface or to the forming material. Also, as pointed out, it is very desirable that the forming material be of the character that it will impart to the cement surface a smooth uniform surface so as to give a pleasing appearance and also eliminate the necessity for further surface work on the concrete by masons.

For example, one type of wood surfacing material that has been used in the past has been conventional plywood panels which have been surface treated with various agents as, for example, a paraffinic type oil. These paraffinic type oils are produced from paraffin crudes and generally have a viscosity in the range from about 10 to 30° SAE. A preferred gravity is one that has an SAE viscosity of about 20°.

In accordance with the present invention, an improved concrete forming panel is prepared which has a longer life than those panels heretofore used, and furthermore produces a smooth pleasing finish on the form concrete. Furthermore, the panel of the present invention has a parting or separation action which outlasts the mechanical life of the plywood which permits its reuse many many times without further treatment. The panel of the present invention imparts to the formed concrete a very desirable gloss and velvety smooth surface without staining of the concrete. These panels likewise are also attractive as a well-varnished piece of finished wood and are highly resistant to alkalies, abrasion, and impact. Furthermore, the factory coating imparted to the plywood panel has excellent adhesion and will not peel or otherwise deteriorate under adverse conditions or under extended use. These panels do not collect dirt, and are clean thereby giving them a pleasing appearance and making them clean handling. A very desirable feature of the present invention is that the panels may be readily repaired in the field if defects are encountered.

The plywood boards may be any type of plywood. However, the preferred type of plywood forming board is a Douglas Fir plywood as defined in "Douglas Fir Plywood Commercial Standard CS45–60 (Tenth Edition-Supersedes CS45–55) Section One-A Revised November 14, 1960."

Thus, one preferred plywood panel of the present invention comprises an exterior, B—B grade Douglas Fir plywood panel manufactured to the required thickness as, for example, in the range from ⅜" to ⅞", preferably ⅝" in thickness. The inner ply may comprise a C grade of ply of the desired thickness. The board is trimmed and sanded and then oiled in a conventional manner with a "form oil."

The form oil is preferably a paraffinic type hydrocarbon oil having an SAE viscosity in the range from about 10 to 30, an A.P.I. gravity of 20° to 30°, and a flash in the range from about 315° to 330° F. One satisfactory oil for treating the panel comprises a "pale oil" having the following specifications:

| | |
|---|---|
| A.P.I. gravity @ 60° F. | 25.5–26.2 |
| Flash (Cleveland Open Cup), ° F. | 315–330 |
| Fire point, ° F. | 355–370 |
| Viscosity Saybolt Universal seconds: | |
| 100° F. | 90–110 |
| 210° F. | 38.3 |
| Pour point, ° F. | −35 to −50 |
| Color ASTM | 1½ to 2 |
| Carbon residue | .10 |
| Viscosity index | 25 |

The oil may be applied to the panel in any desirable manner, such as by spraying or by dipping, so as to secure the desired coating or impregnation of the panel.

While the preferred panel is an exterior B—B grade Douglas Fir, it is to be understood that other grades of fir plywood may be utilized as, for example, Grades A, C, D, and the like.

After the panel has been oiled and edge sealed in the conventional manner, a freshly catalyzed polyurethane two-part finish is applied by spray or other conventional means and allowed to dry or cure. The polyurethane coating material may be any satisfactory ester of a diabasic acid and a polyfunctional alcohol, or a polyether. However, it is preferred that the basic urethane coating system, for use in concrete form boards be a one component system containing an isocyanate-terminated urethane polymer which is cured by atmospheric moisture. Other types of urethane systems; namely, a two can system as well as a blocked urethane system may also be used.

Almost any polyhydroxyl compound may be formulated into a film forming resin with the proper amount of isocyanate. These polyhydroxyl compounds can include polyesters, polyethers and naturally occurring oils.

These polyhydroxyl compounds are reacted with isocyanate to yield a NCO/OH ratio greater than 1 so as to assure terminal NCO groups. The properties of the cured coating may be modified by selection of the polyhydroxyl reactants.

As a further illustration of the urethane systems, the following is typical both for the one can system and the two package system.

*One can system*

A one can urethan system is prepared by reacting under reflux conditions and under inert atmosphere; a diol or triol or any other polyhydroxy compound (polyether polyols, polyester polyols or castor oil), with toluene diisocyanate in a solvent system. The ratio of the isocyanate to polyhydroxy being 2.1/1. The reaction temperature is maintained at reflux and the rate of reaction is controlled by checking the free NCO of the reaction. The urethane prepared above is formulated with solvents to give a 40/50% solid content. Anti-oxidants and driers are also incorporated to give the final urethane coating. The cure of this system is effected by atmospheric moisture.

*Two package system*

A diol, triol or any other polyhydroxy compound is reacted with an isocyanate to yield a isocyanate polyol adduct, with a free NCO of at least 10% based upon 100% solids. This free NCO adduct is then reacted with additional polyhydroxy compound to complete the reaction. The cure of this system is affected independently of moisture. The two components, namely, the isocyanate polyol adduct and the polyhydroxy compounds are mixed together just before the coating is to be used.

A preferred method to obtain a superior appearance is to sand the first coat prior to applying the second identical coat and then drying. Thus, the panel of the present invention, in essence, comprises a plywood panel having a base oil coat and an exterior plastic coat, preferably a dual applied plastic coat. The superior forming panel of the present invention is secured by treating the plywood panel with a "form oil" and thereafter uniquely applying the polyurethane coat over the form oil coat.

This durable unique panel of the present invention has greatly improved characteristics over plywood panels which have been treated either with polyurethane or with the form oil. For example, tests have shown that if the polyurethane is applied to unoiled plywood, not more than four pourings of concrete may be made against the polyurethane finish before hang-up begins to occur. As a matter of fact, only the first and second partings are reasonably clear.

In accordance with the present invention, wherein an abnormal procedure is adopted of applying the polyurethane finish over the oiled plywood, perfect and excellent parting is obtained without any reoiling for at least 17 to 30 pours. These form panels are distinctly superior to panels which have been treated merely with the "form oil" since these panels must be continually reoiled in the field, which is time-consuming and very expensive.

Thus, the form board and the method of manufacture as described heretofore is unique in that no adhesion was expected to be obtained in applying the polyurethane to oiled plywood. Secondly, having obtained adhesion, it was not expected that continual parting could be secured between the form board and the concrete without further reoiling.

In essence, the present invention utilizes an unknown property of polyurethane, namely the ability to permanently adhere to a wood surface coated or saturated with a hydrocarbon oil. This is entirely unexpected since it is generally anticipated that permanent adhesion to oiled plywood cannot be attained with any known finish. Also, by coating or saturating the surface with oil, the tendency of moisture inherent in wood under normal conditions to react with a polyurethane finish causing the finish to become macro and microporous is prevented. Thus, the panel retains a clear bright appearance. With respect to the continual excellent parting characteristics of the present plywood board, it is theorized that the tiny pores in the particular finish allows an extremely thin film of oil to sweat out on the surface as fast as it is removed, thereby replenishing the parting layer which is actually a film of oil.

That the foregoing is the situation is illustrated by the following example:

A set of fir plywood panels was coated with form oil containing an "Oil Red" dye. The panels were then coated with a dual coat of urethane and aged at room temperature for a week. An absorbant white paper coated with solvent (a high flash point aromatic naptha), was rubber over the urethane coating and the paper developed a pink color, indicating seeping of the dyed oil through the pores of the urethane coating.

Thus, the form board of the present invention enables the concrete which is cast against this board to have an extremely smooth surface. There is no staining or discoloration of the concrete from the plastic release coating and no further treatment of the concrete such as grinding or polishing is required. The form board of the present invention has excellent release properties in that both the concrete and the wood surface of the board is protected from damage while, at the same time, giving easy release. The form board of the present invention is definitely superior to the oil ply form boards heretofore utilized. In addition, vibrators may be used without damage in order to enhance the release properties of the surface.

These form boards are self-cleaning and strip from the cast concrete and are immediately ready for re-use without any further processing. The board has a long life which is at least double the life of form boards heretofore used in the art. The boards also may be readily handled at the job site. If, under very severe conditions, a portion of the surfaces is damaged, the remaining coating on the surface will not be adversely affected.

What is claimed is:

1. Improved panel which comprises a fibrous board characterized by having at least one surface coated with form oil and wherein a porous polyurethane film is adhered to the oil coated surface.

2. A panel as defined by claim 1 wherein the fibrous panel is wood and a polyurethane film comprises a dual coat.

3. A panel as defined by claim 2 wherein the form oil comprises a hydrocarbon oil having an A.P.I. gravity in the range from about 20° to 30°, a flash in the range from about 315° to 330° F. and a viscosity in the range from about 10 to 30 SAE.

4. A panel as defined by claim 1, wherein the panel consists of three plies and wherein the thickness of the various plies is in the range of $\frac{1}{12}''$ to $\frac{1}{4}''$.

5. A panel as defined by claim 4 wherein the various plies are Douglas fir veneer.

6. Method of preparing an improved concrete form board having superior parting and life characteristics which comprises coating a panel with form oil and thereafter adhering to the treated surface a porous polyurethane coating.

7. Process as defined by claim 6, wherein the polyurethane coating is applied in a first coat, allowed to dry, and thereafter a second coat applied.

8. Process as defined by claim 7, comprising sanding and cleaning said first coat prior to the application of the second coating.

9. A concrete form board comprising a wood board having at least one surface treated with a form oil and a porous polyurethane coating adhered thereto whereby said boards will have excellent releasing properties for the concrete.

10. A concrete form panel comprising a plywood board having at least one surface coated with form oil and wherein a porous polyurethane film is adhered to the form oil treated surface, whereby an extremely thin film of oil will sweat out on the surface as fast as it is removed.

11. A panel according to claim 10 wherein the polyurethane film comprises dual coats.

12. A panel according to claim 10 wherein the form oil comprises a hydrocarbon oil having an A.P.I. gravity in the range from about 20° to 30°, flash in the range from about 315° to 330° F. and a viscosity in the range from about 10 to 30 SAE.

13. A panel according to claim 12, wherein the board consists of three plies and wherein the thickness of the various plies is about $\frac{1}{12}''$ to $\frac{1}{4}''$.

14. Method as set forth in claim 6 comprising treating a panel initially with a hydrocarbon oil type mold releasing agent.

15. A panel as set forth in claim 10 wherein said polyurethane coating is porous and has a multitude of microscopic pores, and the form oil is a hydrocarbon oil which is permitted to seep through said pores and form an extremely thin film of oil on the outer surface of the polyurethane coating.

References Cited by the Examiner
UNITED STATES PATENTS

| | | | |
|---|---|---|---|
| 2,282,827 | 5/1942 | Rothrock | 260—22 |
| 2,316,752 | 4/1943 | Atkinson et al. | 117—5.1 |
| 2,432,002 | 12/1947 | Frederick et al. | 25—122 |
| 2,441,953 | 5/1948 | Berry et al. | 117—72 |
| 2,630,395 | 3/1953 | McCullogh et al. | 161—225 |
| 2,706,162 | 4/1955 | Brown et al. | 117—72 |
| 2,772,986 | 12/1956 | Buck | 117—72 |
| 2,863,364 | 12/1958 | Rosenquist et al. | 117—5.1 |
| 2,875,020 | 2/1959 | Ring | 21—7 |
| 2,903,380 | 9/1959 | Hoppe et al. | 161—190 |
| 2,914,833 | 12/1959 | Hart et al. | 25—122 X |
| 2,933,413 | 4/1960 | Goldstein | 117—72 |
| 2,937,950 | 5/1960 | Tillman | 117—72 |
| 3,030,249 | 4/1962 | Schollenberger et al. | 117—72 |

ALEXANDER WYMAN, *Primary Examiner.*

CARL F. KRAFFT, EARL M. BERGERT, *Examiners.*

R. J. ROCHE, *Assistant Examiner.*